March 25, 1958 L. H. STAUFFER 2,828,467

METHODS OF AND DEVICES FOR DETERMINING THE MAGNETIC PROPERTIES OF SPECIMENS OF MAGNETIC MATERIAL

Filed March 26, 1952 4 Sheets-Sheet 1

Inventor:
Lynn H. Stauffer,
by Pinnell S. Mack
His Attorney.

Inventor:
Lynn H. Stauffer,
by Bruce S. Mack
His Attorney.

Inventor:
Lynn H. Stauffer,
by Prwell S. Mack
His Attorney.

Inventor:
Lynn H. Stauffer,
by Prowell E. Mack
His Attorney.

2,828,467

METHODS OF AND DEVICES FOR DETERMINING THE MAGNETIC PROPERTIES OF SPECIMENS OF MAGNETIC MATERIAL

Lynn H. Stauffer, Pattersonville, N. Y., assignor to General Electric Company, a corporation of New York Application March 26, 1952, Serial No. 278,552

32 Claims. (Cl. 324—34)

Figure 1:
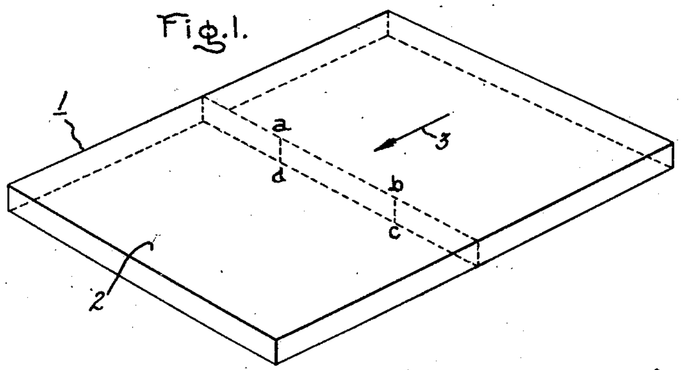

My invention relates generally to methods of and devices for determining the magnetic properties of specimens of magnetic material.

In many industries an accurate knowledge of the magnetic properties of magnetic material is an essential ingredient for success. In the electrical machinery industry, for example, the selection of magnetic materials on the basis of desired magnetic properties enables the production of machinery which has greatly improved operation and efficiency. Thus, more compact and efficient electrical machinery is obtained by selecting magnetic materials which have high permeability and consequent low hysteresis and eddy current losses. It is important, therefore, that means be devised for measuring magnetic properties such as permeability, power loss, etc.

Conventional means for measuring the magnetic properties of magnetic materials have involved the cutting of specially shaped samples from a specimen and the performance of laboratory tests upon the samples. This is a laborious, time-consuming procedure which necessarily results in the mutilation of the specimen from which the samples are taken and often alters the magnetic properties by affecting internal strains in the material. Moreover, the laboratory tests upon samples of sheet materials ordinarily yield average values over a sample. To test small portions of a sample requires the drilling of holes through the sample to facilitate the determination of flux density in particular portions of the sample. This, of course, destroys the usefulness of the sample for other purposes and is an expensive expedient to employ. Furthermore, with anisotropic materials, complete information upon various portions of the sample may not be obtained until a great succession of holes has been drilled in the sample.

Accordingly, it is a general object of my invention to provide improved means for determining the magnetic properties of magnetic materials.

It is another object of my invention to provide improved means for determining the magnetic properties of magnetic materials in a manner which does not necessitate the mutilation of the specimen.

It is a further object of my invention to provide improved means for determining the magnetic properties of magnetic materials in a selected portion of a desired specimen.

It is a still further object of my invention to provide improved means for determining the flux density, the power loss, the permeability and the magnetic intensity in magnetic materials.

It is yet another object of my invention to provide novel means for measuring the voltage induced along the surface of a specimen which is traversed by a time-varying magnetic flux.

It is a further object of my invention to provide a novel means for determining the direction of the lines of flux in a specimen of magnetic material.

It is a still further object of my invention to provide a novel means for obtaining a flux plot of the lines of flux in a specimen of magnetic material.

According to one aspect of my invention which is more fully described and explained hereinafter, a specimen of magnetic material is magnetized with a time-varying magnetic flux. The voltage induced along a surface of this specimen between two predetermined points is measured by positioning one of a pair of pointed conductors at each of the predetermined points and connecting the conductors to a voltage responsive device. As will be exhibited later, this voltage serves as an indication of the flux traversing the specimen and hence as a measure of the flux density in the specimen. By combining in novel ways the voltage derived in this fashion with a voltage proportional to the magnetic field intensity in the specimen, various desired magnetic properties of the specimen are obtained quickly, easily and economically.

My invention, including the various objects and advantages thereof, will be better understood from the following description taken in connection with the accompanying drawings and its scope will be denoted in the appended claims.

Figures 2, 3:
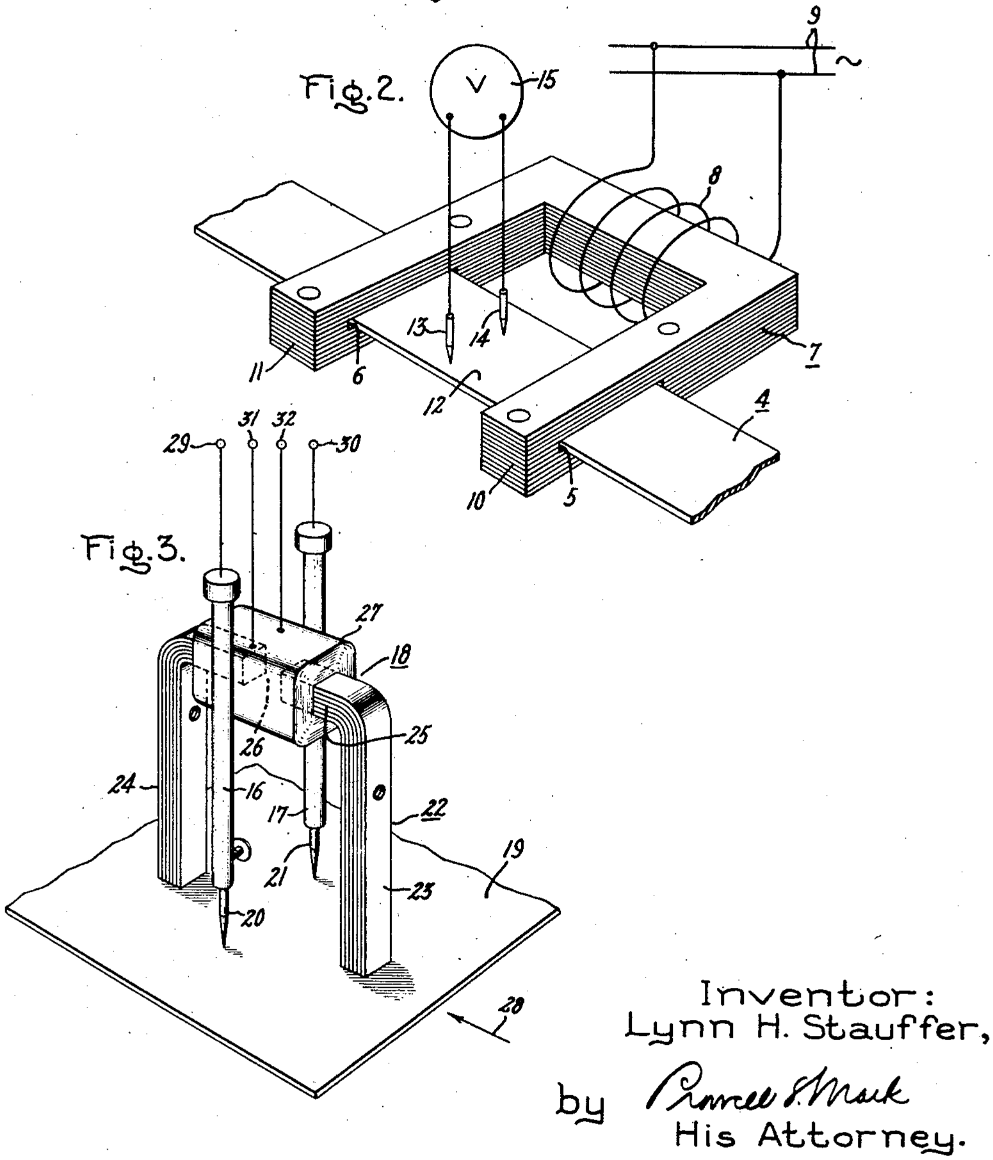
Figure 4:
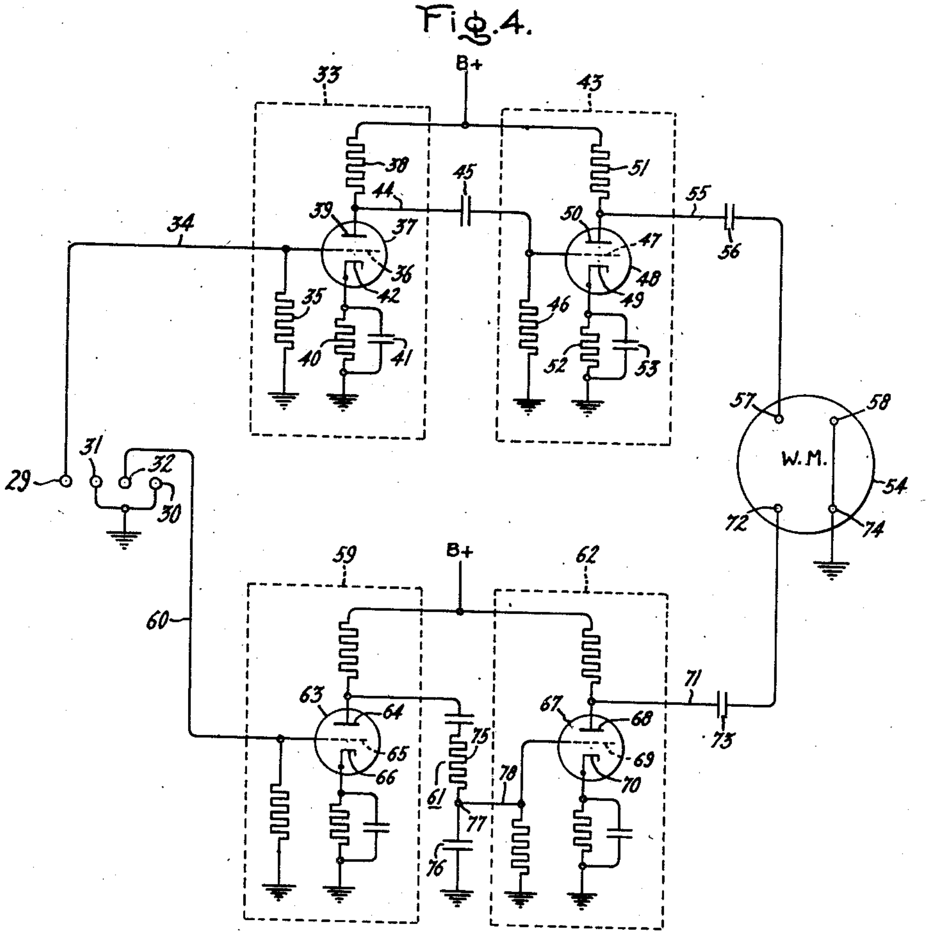
Figure 5:
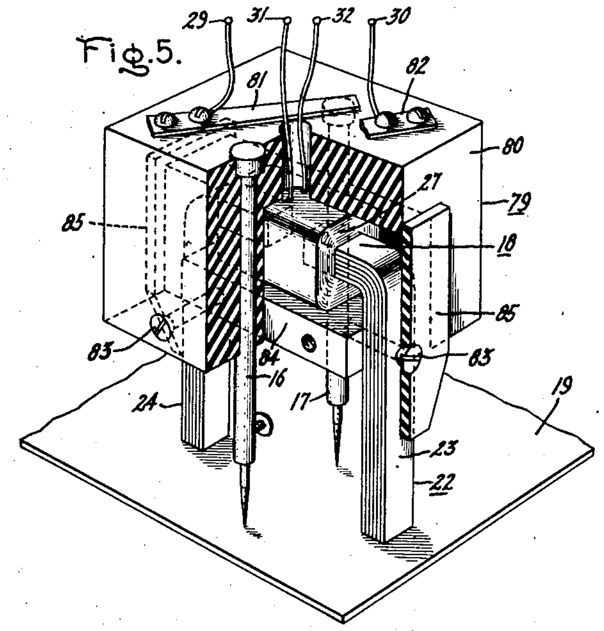
Figure 6:
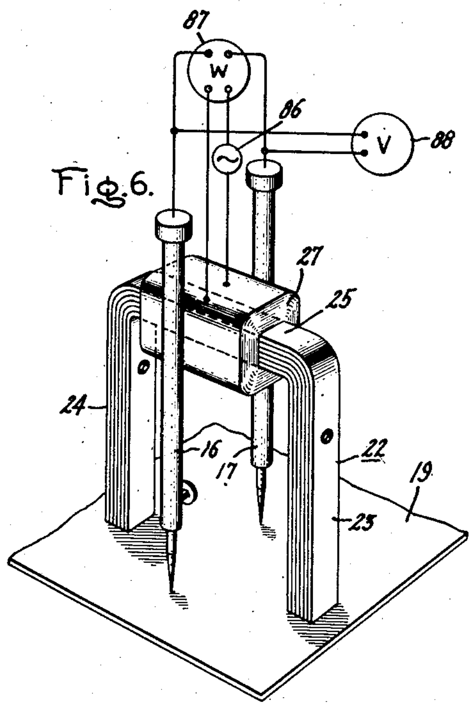
Figure 7:
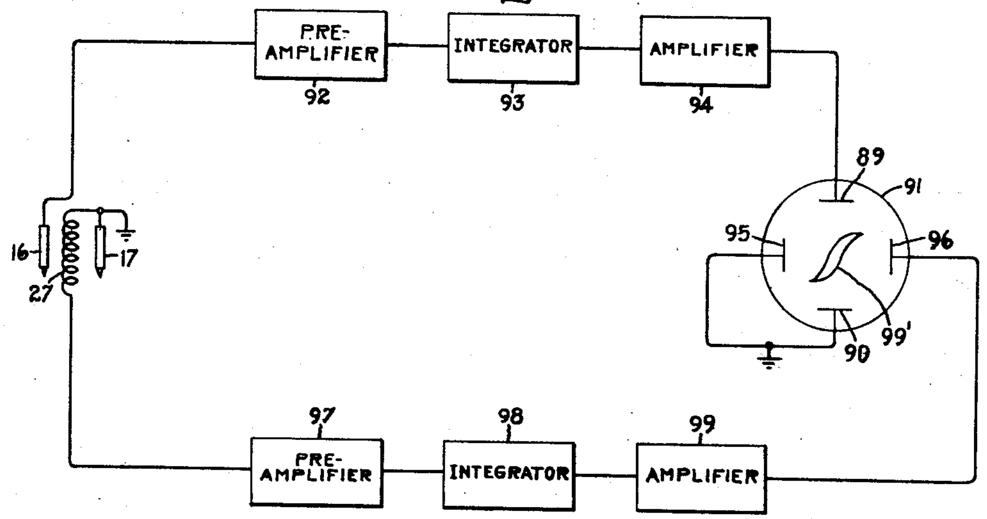
Figure 8:
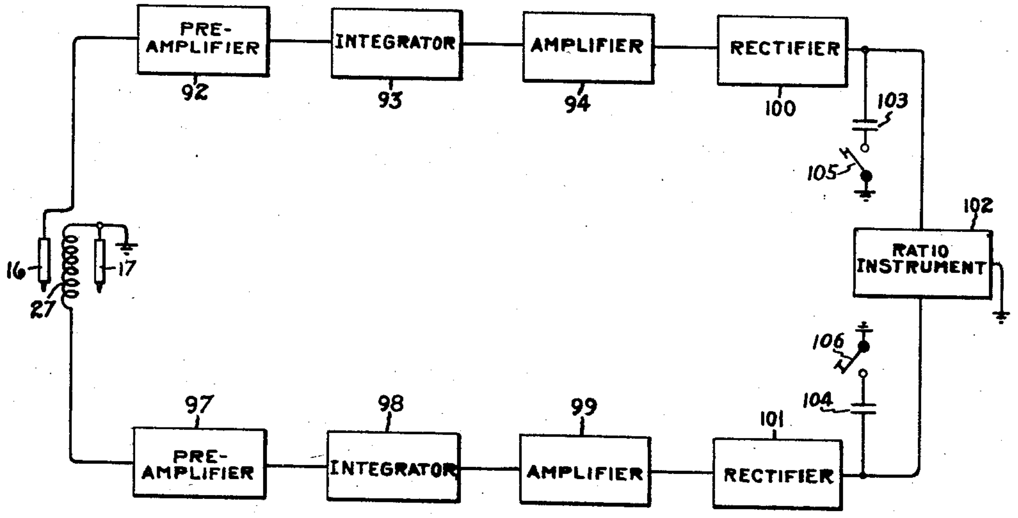

In the drawings, Fig. 1 is a diagrammatic illustration useful in explaining the invention; Fig. 2 is a simplified perspective view of one embodiment of the invention; Fig. 3 is a simplified perspective view of another embodiment of the invention; Fig. 4 is a schematic diagram of circuitry usefully employed with the embodiment shown in Fig. 3; Fig. 5 is a detailed perspective view, partially broken away, of support means for the embodiment of Fig. 3; Fig. 6 is a simplified perspective view with schematically illustrated circuit connections of another embodiment of the invention; Fig. 7 is a schematic diagram showing circuitry which is employed in connection with the embodiment of Figs. 3 and 5 to display a hysteresis loop of a specimen of magnetic material; and Fig. 8 is a schematic diagram illustrating circuitry which is utilized in connection with the embodiment of Figs. 3 and 5 to obtain a measure of the permeability of the specimen of magnetic material.

My invention is based upon the realization that if a specimen of magnetic material is excited by time-varying magnetic flux, the voltage induced between spaced points on a surface of the specimen which is parallel to at least a component, if not all, of the time-varying magnetic flux represents the time rate of change of flux through a cross section of the specimen perpendicular to the direction of the flux component. Thus, if the spaced points are selected such that a line joining them is perpendicular to the direction of the flux component, the induced voltage between them provides a measure of the maximum change of flux through a cross section of the specimen, one side of which is defined by line joining the spaced points. Once the distance between the spaced points and the thickness of the cross section of the specimen are determined, the induced voltage can be translated into a measure of the flux density at the selected position in the specimen. As will be pointed out hereinafter, this realization enables the measurement of the magnetic properties of a specimen of magnetic material in a facile, economical and versatile manner.

By reference to Fig. 1, a more thorough understanding of the principles of my invention may be obtained. In Fig. 1 a specimen 1 of a magnetic material such as sheet steel is represented as traversed by a time-varying magnetic flux, at least a component of which is parallel to the surface 2 and perpendicular to cross section *abcd* as indicated by the arrow 3. If the time-varying flux is assumed to be sinusoidal in form, then the flux density B in cross section *abcd* may be defined as:

$$B=B_0 \sin 2\pi ft \qquad (1)$$

where $B_0$ is the peak value of the flux density, $f$ is the frequency of the alternating flux density, and $t$ is the time parameter. Since $\phi$, the flux through cross section *abcd*, equals B times A, the area of cross section *abcd*, we may write $$\phi=BA=B_0A\sin 2\pi ft \quad (2)$$

The voltage V induced around the cross section *abcd* is proportional to the time rate of change of flux therethrough; hence we may state:

$$V=\frac{d\phi}{dt}\times 10^{-8}=10^{-8}B_0A\frac{d}{dt}\sin 2\pi ft \quad (3)$$

where V is in volts. Differentiating Equation 3 as indicated, we obtain $$V=10^{-8}2\pi fB_0A\cos 2\pi ft \quad (4)$$

From Equation 4 it is apparent that $$V_0=10^{-8}2\pi B_0A \quad (5)$$

where $V_0$ is the peak value of the voltage induced along cross section *abcd*.

Now if the flux $\phi$ through *abcd* is substantially uniform and the distance *cb* is relatively small compared to the distance *ab*, then the voltage $V_1$ induced between points *a* and *b* (or for that matter between points *c* and *d*) is approximately ½ V, and the peak value $V_2$ of the voltage induced between points *a* and *b* is approximately ½ $V_0$. Consequently, the voltage $V_1$ is proportional to V and the voltage $V_2$ is proportional to $V_0$. As will be set forth later, I measure the voltage induced between points *a* and *b* by means of a pair of spaced apart, pointed, conductive members or probes connected to a voltage responsive device and positioned respectively at points *a* and *b*. Thus, I am able, according to my invention, to measure the flux traversing and the flux density in a selected cross section of a specimen without mutilating the specimen in any way.

In the embodiment of Fig. 2, there is illustrated a specimen 4 of a magnetic material such as sheet steel which is inserted through apertures 5 and 6 in a U-shaped laminated magnetic core 7. Laminated magnetic core 7 may be excited by a winding 8 disposed at a convenient position upon the core 7 and energized from a suitable source of alternating current 9 as illustrated. It will be observed that the portion of specimen 4 lying within apertures 5 and 6 and extending between the legs 10 and 11 of magnetic core 7 serves to complete the magnetic circuit including core 7 and hence is traversed along its length by a time-varying magnetic flux. As explained heretofore, the flux traversing the length of specimen 4 induces a voltage along the surface thereof which is proportional in magnitude to the time rate of change of the flux and is perpendicular in direction to the direction of the flux.

According to my invention, I position a pair of spaced apart, conductive, pointed members or probes 13 and 14 in conductive relation with the surface 12 (or for that matter against the surface opposite surface 12) of specimen 4 and connect them as shown to a voltage responsive device 15 in order to measure the voltage induced along the surface by the time-varying magnetic flux. If probes 13 and 14 are rotated on surface 12 at a fixed distance with respect to each other, a maximum reading upon voltage responsive device 15 occurs when a line joining the axes of the probes is perpendicular to the lines of flux within specimen 4. Conversely, a minimum reading upon voltage responsive device 15, including zero, occurs when a line joining corresponding points respectively on the longitudinal axes of the probes is parallel to the lines of flux within specimen 4. Consequently, the direction of the lines of flux within specimen 4 may be easily determined in this manner. And, by rotating probes 13 and 14 until a zero reading is obtained upon voltage responsive device 15, then proceeding stepwise along the surface of specimen 4, using first one probe and then the other as an axis to obtain a succession of zero readings, the direction of a line of flux can be traced out. Also, by positioning probes 13 and 14 on the surface of specimen 4 and observing the reading upon voltage responsive device 15, the direction of a line of flux within specimen 4 may be traced out by moving one of the probes in a general lengthwise direction along specimen 4, while holding the other probe fixed, to maintain the reading upon voltage responsive device 15 constant at the observed value. The repetition of this process for various readings, including zero, upon voltage responsive device 15 produces a flux plot for specimen 4.

Voltage responsive device 15 should have high input impedance inasmuch as the voltage induced between probes 13 and 14 is not capable of supplying a high current to a low impedance circuit. Several of the high input impedance electronic voltmeters now commercially available are suitable for this purpose. In the embodiment of Fig. 2, voltage responsive device 15 is preferably a voltmeter which is capable of indicating the root mean square value or the peak value of the voltage induced along the surface of specimen 4. As an example of the sensitivity required for voltage responsive device 15, it may be calculated from Equation 5 that the peak value of the voltage induced between probes 13 and 14 is approximately 2.65 millivolts when the flux density within specimen 4 is 100,000 lines per sq. in., the thickness of specimen 4 is 0.014 in. and the distance between probes 13 and 14 perpendicular to the direction of the lines of flux is 1 in. Voltage responsive device 15 may be calibrated in terms of total flux or in terms of flux density for a given constant spacing between probes 13 and 14 and a given constant thickness of specimen 4. Alternatively, the values of total flux and flux density may be computed from the above equations upon substitution of the known values of the frequency of the exciting source, the voltage induced upon the specimen surface, the separation between probes 13 and 14 and the thickness of the specimen. While the thickness of the specimen must be small in comparison with the probe separation in order for the measured voltage to equal approximately ½ the voltage induced around the cross section under consideration, suitable alterations can obviously be made in the computations or in the calibration of voltage responsive device 15 to compensate for the proportionally smaller voltages measured with thicker specimens.

As may be readily seen from the foregoing, it is essential to the proper utilization of my invention that probes 13 and 14 make conductive contact with the surface of a specimen. If conductive contact is not accomplished, no reading upon voltage responsive device 15 will be obtained. Since specimens of magnetic material are usually coated with a layer of relatively non-conductive oxide or a layer of an insulating varnish, etc., I prefer that conductive members 13 and 14 be pointed as indicated in Fig. 2 to facilitate their penetration to the conductive surface of the specimen. Of course, if the surface of the specimen is well cleaned, some broadening of the points of probles 13 and 14 may be permitted; however, the broadening should be limited in order to allow accurate determination of the dimensions of the cross section under consideration.

It is well known that the $\oint H dB$ (the integral over one cycle of the hysteresis loop) provides a measure of the power loss in a specimen of magnetic material which is traversed by a time-varying magnetic flux. From the foregoing Equation 3, it is readily observed that the voltage induced along the surface of a specimen of magnetic material which is traversed by time-varying magnetic flux as herein before specified is proportional to the time rate of change of flux density B within the specimen. In accordance with the invention, I obtain such a voltage and combine it with a voltage which is proportional to the time rate of change of magnetic field intensity within a specimen to secure a device which is capable of measuring the power loss in a desired defined portion of a specimen of magnetic material. In the embodiment of Fig. 3 and the associated circuitry of Fig. 4, there is shown a novel power loss measuring device which comprises a pair of conductive probes 16, 17 and a magnetic potentiometer 18 which are adapted for positioning as illustrated upon a sheet specimen 19 of magnetic material. Probes 16 and 17 preferably terminate in conductive, pointed members 20 and 21, respectively, for the hereinbefore mentioned purpose of facilitating conductive contact with the surface of specimen 19. Magnetic potentiometer 18 comprises a magnetic core 22 having a pair of laminated legs 23, 24 and a yoke 25 which is discontinuous to provide an air gap 26. Positioned about yoke 25 bridging air gap 26 is a winding 27 within which a voltage proportional to the time-varying magnetic flux traversing air gap 26 is induced. Assuming that specimen 19 is traversed by a time-varying magnetic flux having at least a component in the direction indicated by the arrow 28, spaced apart, conductive probes 16, 17 are positioned as explained above such that a line joining their longitudinal axes is perpendicular to the direction of the time-varying magnetic flux component in specimen 19, whereby a voltage proportional to the time rate of change of the time-varying flux component appears across terminals 29, 30. Magnetic potentiometer 18 is positioned with the ends of legs 23, 24 bearing against the surface of specimen 19 such that a line joining any two points respectively on the longitudinal axes of legs 23, 24 is perpendicular to a line joining any two points respectively on the longitudinal axes of probes 16, 17. The time-varying voltage appearing across the terminals 31, 32 of winding 27 is then proportional to the time rate of change of magnetic field intensity within specimen 19.

Laminated legs 23 and 24, as well as yoke 25, should be constructed of low loss, high permeability magnetic material so that the magnetomotive force across gap 26 substantially equals the magnetomotive force between the ends of legs 23, 24 which abut specimen 19. When the magnetomotive force across gap 26 is considered as substantially equal to the magnetomotive force between the ends of legs 23 and 24, it is apparent that the voltage induced in winding 27 is proportional to the time rate of change of magnetic intensity within specimen 19 between legs 23 and 24. Accordingly, it is clear that probes 16, 17 and magnetic potentiometer 18 respectively provide voltages which are proportional to the time rate of change of flux density and the time rate of change of magnetic field intensity within a portion of specimen 19, the limits of which are defined by the positions of probes 16, 17 and legs 23, 24.

As is shown in the circuit diagram of Fig. 4 wherein terminals 29—32 are also illustrated for the sake of clarity, the voltage appearing across terminals 29, 30 is supplied to the input circuit of a resistance-coupled amplifier stage 33 through a conductor 34. Amplifier stage 33 comprises a grid-leak resistor 35 which is connected to ground at one end and at the other end to conductor 34 and the grid electrode 36 of a high vacuum electron discharge tube 37. Operating voltage is supplied from a source of direct voltage indicated as B+ through a resistor 38 to the plate electrode 39 of tube 37. Bias is provided for tube 36 by the parallel combination of a resistor 40 and a capacitor 41 connected between the cathode 42 of tube 37 and ground as illustrated. Amplifier stage 33 is connected in cascade with an amplifier stage 43 by a conductor 44 which extends from plate electrode 39 of tube 37 through a blocking capacitor 45 to the input grid-leak resistor 46 of amplifier stage 43. Grid-leak resistor 46 is also connected as shown to the grid electrode 47 of a high vacuum discharge tube 48 having a cathode 49 and a plate electrode 50. Operating voltage may be supplied to discharge tube 48 from the hereinbefore mentioned source of direct voltage indicated as B+ through a resistor 51 connected to plate electrode 50. Bias for discharge tube 48 is provided by the parallel combination consisting of a resistor 52 and a capacitor 53 connected between cathode 49 and ground. The output of amplifier stage 43 is directed to a wattmeter 54 by means of a conductor 55 connected through a blocking capacitor 56 to a terminal 57 of wattmeter 54. The remaining terminal 58 of the wattmeter coil (not shown) to which terminal 57 is connected is maintained at ground potential as illustrated.

The voltage appearing across terminals 31 and 32 is supplied to an input circuit of an amplifier stage 59 through a conductor 60 connected to terminal 32. The amplified output of amplifier stage 59 is directed through an integrating circuit 61 to the input circuit of an amplifier stage 62. Amplifier stage 59 comprises a high vacuum discharge tube 63 having a plate electrode 64, a grid electrode 65 and a cathode 66; amplifier stage 62 comprises a high vacuum discharge tube 67 having a plate electrode 68, a grid electrode 69 and a cathode 70. Since amplifier stages 59 and 62 are substantially identical with the hereinbefore described amplifier stages 33 and 43, repeated elaboration of the illustrated circuit elements is unnecessary to an understanding thereof. The output of amplifier stage 62 is supplied by a conductor 71 to a terminal 72 of wattmeter 54 through a blocking capacitor 73. The other terminal 74 of the wattmeter coil (not shown) to which terminal 72 is connected is maintained at ground potential as shown.

It will now be apparent that if probes 16, 17 and magnetic potentiometer 18 are positioned as specified hereinbefore upon specimen 19, wattmeter 54 will indicate a reading proportional to the power loss in specimen 19 providing the voltages appearing across terminals 57, 58 and terminals 72, 74 are proportional to H*d*B. However, since the voltge appearing across terminals 29, 30 is proportional to the time rate of change of flux density B in specimen 19 while the voltage appearing across terminals 31, 32 is proportional to the time rate of change of magnetic field intensity H in specimen 19, it is obvious that mere amplification of these voltages through identical amplifier stages produces voltages proportional to *d*B*d*H, rather than voltages proportional to H*d*B. Accordingly, integration circuit 61 comprising a resistor 75 and a capacitor 76 is inserted between the output of amplifier stage 59 and the input of amplifier stage 62. The values of resistors 75 and capacitor 76 are relatively quite large so that the time constant of integration circuit 61 is relatively long. The voltage appearing across capacitor 76 between point 77 and ground therefore is directly proportional to the magnetic field intensity H in specimen 19. Since the voltage appearing across capacitor 76 is supplied to the input of amplifier stage 62 through a conductor 78, the output of amplifier stage 62 is proportional to the magnetic field intensity H in specimen 19 and hence the combination of voltages directed to the terminals of wattmeter 54 is proportional to H*d*B, whereby wattmeter 54 indicates the power loss in specimen 19.

The embodiment of Figs. 3 and 4 may be calibrated by placing probes 16, 17 and magnetic potentiometer 18 upon the surface of a uniform, thin specimen excited with a known magnetic flux density. It should be observed that it is necessary to the accuracy of the invention for amplifier stages 33, 43, 59 and 62 to have essentially zero phase shift therethrough. Precautions which should be observed for obtaining essentially zero phase shift through an amplifier stage may be found in any of the well known text books or treatises relating to amplifier circuits, e. g., "Vacuum Tube Amplifiers," by H. E. Valley and Henry Wallman, Radiation Laboratory Series, vol. 18, McGraw-Hill (1948). It will be apparent from the foregoing that integration circuit 61 may be inserted between amplifier stages 33 and 43 instead of between amplifier stages 59 and 62. In such event, the combination of voltages supplied to wattmeter 54 are proportional to $BdH$ which likewise provides a measure of the power loss in specimen 19.

In isotropic materials the lines of flux are parallel with the magnetic field intensity H; hence, positioning probes 16, 17 and magnetic potentiometer 18 as described above provides a maximum measure of the power loss in an istoropic specimen. Of course, if it is desired to measure a portion of the power loss, the positions of conductive probes 16, 17 and magnetic potentiometer 18 may be varied with respect to each other and with respect to the specimen. Moreover, the lines of flux and the magnetic field intensity in anisotropic materials are frequently not parallel to each other; and, in such circumstances, the angular relationship of magnetic potentiometer 18 with respect to conductive probes 16, 17 must be shifted to obtain a maximum power loss reading. Accordingly, it should be definitely understood that I contemplate positioning probes 16, 17 and magnetic potentiometer 18 at angles other than 90° with respect to each other. In general, with anisotropic materials a maximum power loss reading on wattmeter 54 is obtained by positioning probes 16, 17 such that a line joining their longitudinal axes is perpendicular to the flux component under consideration and by positioning magnetic potentiometer 18 such that a line joining any two corresponding points respectively on the longitudinal axes of legs 23, 24 is parallel to the magnetic field intensity H.

Obviously, integration circuit 61 need not be of the specific form disclosed and may comprise other well known networks devised for integration purposes. Examples of suitable alternative integration circuits may be found in "Electronic Time Measurements," by Chance, Hulsizer, MacNichol and Williams, Radiation Laboratory Series, vol. 20, McGraw-Hill (1949) or "Electronic Instruments," by Greenwood, Holdam and MacRae, Radiation Laboratory Series, vol. 21, McGraw-Hill (1948). Wattmeter 54 should be suitably sensitive commensurate with the magnitude of the input signals thereto and may comprise a light beam wattmeter patterned after an actatic reflecting dynamometer as described by S. C. Richardson in the "General Electric Review" for October 1945, p. 59.

In Fig. 5 wherein numerals employed hereinbefore are utilized to identify like elements, there is shown a measuring head 79 comprising probes 16, 17 and magnetic potentiometer 18. Probes 16 and 17 are maintained in fixed, spaced apart relationship with respect to each other by means of a support member 80 of insulating material. Probes 16, 17 are slidable within support member 80 and are respectively spring loaded by means of leaf spring members 81, 82 respectively. Magnetic core 22 maintained with legs 23, 24 in fixed, spaced apart relationship by means of screws 83 (two of which are not shown) which are threaded into a spreader block 84 of non-magnetic material such as brass or plastic. The two screws 83 which are inserted through the laminations of magnetic core 22 bear at their heads against cover plates 85 to assure positive retention of the laminations of core 22. The lengths of legs 23, 24 are so selected that they terminate in a plane which is nearer support member 80 than the plane in which the pointed ends of probes 16, 17 terminate. Therefore, when measuring head 79 is pressed against the surface of a specimen, probes 16, 17 will slide within support member 80 against the opposing pressure of spring members 81, 82 until legs 23, 24 contact the surface of the specimen. This insures that probes 16, 17 will break through any oxide or insulation upon the surface of the specimen and make the required conductive contact therewith.

Core 22 of magnetic potentiometer 18 may, if desired, be constructed of a suitable non-magnetic material such as plastic and employed to support a winding (not shown) in which a voltage proportional to the time rate of change of the magnetic field intensity H is induced. In such event, the winding must extend about the length of the core and the two ends thereof make magnetic contact with the specimen at spaced points. The non-magnetic core need not have an air gap and need not have any particular shape so long as it provides adequate support for the winding. Of course, if the winding is so constructed that it does not require support, the non-magnetic core may be entirely eliminated; however, the two ends of the winding must always make magnetic contact with the specimen.

In the embodiment of Fig. 6 wherein reference numerals employed hereinbefore are utilized to identify like elements, yoke 25 of magnetic core 22 is continuous and winding 27 is energized by a source of time-varying voltage 86. This modification of the invention makes it unnecessary to provide a separate source of magnetic excitation for specimen 19 inasmuch as the magnetic field generated by winding 27 is directed to traverse specimen 19 in the desired manner through magnetic core 22. The current in coil 27, however, is now approximately proportional to the magnetic intensity H in specimen 19 instead of being proportional to the time rate of change of magnetic intensity as in the embodiment of Figs. 3 and 4. Therefore, no integration of the voltages is now necessary and connections may be made directly (or through amplifiers) to a wattmeter 87 from probes 16, 17 and winding 27 as illustrated. Even though magnetic core 22 may be designed to have a relatively low reluctance, there must always be some drop in magnetic potential therealong. This drop deleteriously affects the accuracy of the embodiment of Fig. 6 as a device for measuring absolute power loss in a specimen; consequently, it has more utility in comparing the relative power loss at constant flux density in various different specimens of magnetic material. As a comparative device, it is positioned upon the surface of a specimen and the current through winding 27 is varied by adjusting the output of source 86 until a desired reading is obtained upon a voltmeter 88 which is connected across probes 16, 17. The device of Fig. 6 is then positioned upon another specimen and the current through winding 27 varied until the same reading is obtained upon voltmeter 88. The two readings of wattmeter 87 are then an indication of the comparative power loss of the two specimens.

In the embodiment of Fig. 3, it has been explained that the voltage appearing across probes 16, 17 is proportional to the time rate of change of flux density B within a specimen and the voltage appearing across winding 27 is proportional to the time rate of change of magnetic intensity H within this specimen. If both these voltages are integrated the resulting voltages are therefore proportional respectively to the flux density B and the magnetic intensity H within the specimen. If these integrated voltages are then applied respectively to the vertical and horizontal plates of an oscilloscope, the hysteresis loop of the specimen will be displayed. In the embodiment of Fig. 7 there is illustrated in simplified fashion a circuit which is capable of performing these functions and of displaying the hysteresis loop of a specimen according to the invention. As shown, the voltage appearing across probes 16, 17 in the embodiment of Fig. 3 is supplied to the vertical plates 89, 90 of an oscilloscope 91 through a pre-amplifier 92, an integrator 93 and an amplifier 94, the latter of which produces an output proportional to flux density B. The voltage appearing across winding 27 in the embodiment of Fig. 3 is directed to the horizontal plates 95, 96 of oscilloscope 91 through a pre-amplifier 97, an integrator 98 and an amplifier 99, the latter of which produces an output proportional to magnetic intensity H. Therefore, the hysteresis loop 99' of a specimen (not illustrated) is displayed upon oscilloscope 91. It will be understood that the amplifier and integrating circuits employed in this modification of the invention may be similar to the amplifier and integrating circuits described hereinbefore in connection with the embodiment of Figs. 3 and 4.

In the embodiment of Fig. 8, there is illustrated in simplified fashion a device according to the invention which is capable of determining the permeability of a specimen of magnetic material. In Fig. 8 wherein numerals employed before are used to indicate like elements, the outputs of amplifiers 94, 99 are respectively rectified by rectifiers 100, 101 and supplied to a ratio instrument 102 which provides a reading equal or proportional to the quotient of the outputs of rectifier 100 and rectifier 101. Ratio instrument 102 may conveniently be of the type described in "Electrotechniche Zeitschrift," vol. 64, p. 258 (May 20, 1943). As has been pointed out above in connection with Fig. 7, the output of amplifier 94 is proportional to the flux density B in a specimen (not shown); hence, the output of rectifier 100 is likewise proportional to the flux density in the specimen. Similarly, the output of amplifier 99 is proportional to the magnetic intensity H in the specimen; hence, the output of rectifier 101 is likewise proportional to the magnetic intensity H in the specimen. Therefore, the reading of ratio instrument 102, which is proportional to or equal to the quotient or ratio of the outputs of rectifiers 100 and 101, provides a measure of the magnetic permeability of the specimen.

Either average or peak measurements of magnetic permeability may be obtained from the embodiment of Fig. 8 by means of capacitors 103, 104 and switches 105, 106. If switches 105 and 106, which are respectively connected in series with the capacitors 103 and 104 in parallel with the input connections to ratio instrument 102, are open as shown, average readings are secured from ratio instrument 102. If switches 105 and 106 are closed, peak readings may be observed upon ratio instrument 102.

While my invention has been described by reference to particular embodiments thereof, alternative constructions and methods will readily occur to those skilled in the art. I, therefore, aim in the appended claims to cover all such equivalent embodiments as may be within the true spirit and scope of the foregoing description.

What I claim as new and desire to secure by Letters Patent of the United States is:

1. The method of determining the direction of lines of flux in a specimen of magnetic material which comprises exciting the specimen with a time-varying magnetic flux at least a component of which is parallel to a selected surface of said specimen, positioning a pair of spaced apart conductive probes in conductive relation with said selected surface of said specimen, connecting said probes to a voltage-measuring device, rotating said probes at a fixed distance with respect to each other on said selected surface of said specimen, and observing the position of said probes which produces the maximum reading on said voltage-measuring device whereby a line joining the two probes in said pair indicates a direction perpendicular to the lines of flux in said specimen.

2. The method of determining the direction of lines of flux in a specimen of magnetic material which comprises exciting the specimen with a time-varying magnetic flux at least a component of which is parallel to a selected surface of said specimen, positioning a pair of spaced apart conductive probes in conductive relation with said selected surface of said specimen, connecting said probes to a voltage-measuring device, rotating said probes at a fixed distance with respect to each other on said selected surface of said specimen, and observing the position of said probes which produces the minimum reading on said voltage-measuring device whereby a line joining corresponding points respectively on the longitudinal axes of the two probes in said pair indicates a direction parallel to the lines of flux in said specimen.

3. The method of determining the direction of lines of flux in a specimen of magnetic material which comprises exciting the specimen with a time-varying magnetic flux at least a component of which is parallel to a selected surface of said specimen, positioning a pair of spaced apart conductive probes in conductive relation with said selected surface of said specimen, connecting said probes to a voltage-measuring device, rotating said probes at a fixed distance with respect to each other on said selected surface of said specimen about one of said probes as an axis, and observing the position of said probes which produces a zero reading on said voltage responsive device whereby a line joining corresponding points respectively on the longitudinal axes of the two probes in said pair indicates a direction parallel to the lines of flux in said specimen.

4. The method of tracing the direction of a line of flux in a specimen of magnetic material which comprises exciting the specimen with a time-varying magnetic flux at least a component of which is parallel to a selected surface of said specimen, positioning a pair of spaced apart conductive probes in conductive relation with said selected surface of said specimen, connecting said probes to a voltage responsive device and adjusting said probes to obtain a desired reading including zero of said voltage responsive device, and moving one of said probes along said selected surface of said specimen to maintain said desired reading of said voltage responsive device constant whereby the line traced by said probe represents a line of flux in the specimen.

5. The method of obtaining a flux plot of the lines of flux in a specimen of magnetic material which comprises exciting the specimen with a time-varying magnetic flux at least a component of which is parallel to a selected surface of said specimen, positioning a pair of spaced apart conductive probes in a conductive relation with said selected surface of said specimen, connecting said probes to a voltage responsive device and adjusting said probes to obtain a desired reading of said voltage responsive device, moving one of said probes along said selected surface of said specimen to maintain said desired reading of said voltage responsive device constant whereby the line traced by said probe represents a line of said flux in the specimen, adjusting said probes to obtain a different reading of said voltage responsive device and moving one of said probes along said selected surface of said specimen to maintain said different reading of said voltage responsive device constant whereby a second line of flux is traced, and repeating said last-recited step for still different readings of said voltage responsive device to obtain the desired flux plot.

6. A device for measuring the voltage induced along the surface of a specimen of magnetic material comprising a laminated core of magnetic material having at least one aperture through which the specimen may be inserted, winding means for exciting said core and the specimen with a time-varying magnetic flux, a pair of spaced apart conductive probes adapted to be positioned in essentially point contact with a surface of the specimen which is parallel to at least a component of said time-varying magnetic flux traversing the specimen, and a voltage responsive instrument connected to said spaced apart conductive probes for measuring the voltage induced in the specimen between the points of contact of said probes.

7. A device for measuring the magnetic properties of a specimen of magnetic material comprising a magnetic circuit for traversing at least a portion of the specimen by a time-varying magnetic flux, a pair of spaced apart conductive probes to be positioned in essentially point contact with a flux carrying surface of the specimen which is parallel to at least a component of the time-varying flux traversing the specimen, a winding to be magnetically coupled to at least a component of the time-varying flux traversing the specimen, and circuit means connected to said winding and said probes for translating electrical signals derived from said winding and said probes into an indication of a magnetic property of said specimen.

8. A device for measuring the magnetic properties of a specimen of magnetic material comprising a magnetic circuit for traversing at least a portion of the specimen by a time-varying flux, a pair of spaced apart conductive probes to be positioned in essentially point contact with a flux carrying surface of the specimen which is parallel to at least a component of the time-varying flux traversing the specimen, a winding to be magnetically coupled at spaced points on said specimen to at least a component of the time-varying flux traversing the specimen, a line joining said spaced points intersecting a line joining the points of contact of said conductive probes, and circuit means connected to said winding and said probes for translating electrical signals derived from said winding and said probes into an indication of a magnetic property of said specimen.

9. In a device as in claim 8 in which a line joining the points of contact of said conductive probes intersects a line joining said spaced points at an angle of essentially 90°.

10. A device for measuring the magnetic properties of a specimen of magnetic material comprising a magnetic circuit for traversing at least a portion of the specimen by a time-varying magnetic flux, a pair of spaced apart conductive probes to be positioned in essentially point contact with a flux carrying surface of the specimen which is parallel to at least a component of the time-varying magnetic flux traversing the specimen, a magnetic potentiometer comprising a winding adapted to be coupled to at least a component of the time-varying flux traversing the specimen, and circuit means connected to said winding and said probes for translating electrical signals derived from said winding and said probes into an indication of a magnetic property of said specimen.

11. In a device for measuring the magnetic properties of a specimen of magnetic material which is traversed by a time-varying magnetic flux, a pair of spaced apart conductive probes adapted to be positioned in essentially point contact with a surface of the specimen which is parallel to at least a component of the time-varying magnetic flux traversing the specimen, a magnetic core having a pair of spaced apart legs adapted to bear at their extremities against the same surface of the specimen as said probes, said probes and said magnetic core legs being positioned with respect to each other such that a line joining any two points respectively on the longitudinal axes of said legs is at an angle other than zero with respect to a line joining any two points respectively on the longitudinal axes of said probes, a winding on said core, and circuit means connected to said winding and said probes for translating electrical signals derived from said winding and said probes into an indication of a magnetic property of the specimen.

12. In a device for measuring the magnetic properties of a specimen of magnetic material which is traversed by a time-varying magnetic flux, a pair of spaced apart conductive probes adapted to be positioned in essentially point contact with a surface of the specimen which is parallel to at least a component of the time-varying magnetic flux traversing the specimen, a magnetic core having a pair of spaced apart legs adapted to bear at their extremities against the same surface of the specimen as said probes, said probes and said magnetic core legs being variably positioned with respect to each other such that a line joining any two points respectively on the longitudinal axes of said legs is at an angle other than zero with respect to a line joining any two points respectively on the longitudinal axes of said probes, a winding on said core, and circuit means connected to said winding and said probes for translating electrical signals derived from said winding and said probes into an indication of a magnetic property of the specimen.

13. In a device for measuring the magnetic properties of a specimen of magnetic material which is traversed by a time-varying magnetic flux, a pair of spaced apart conductive probes adapted to be positioned in essentially point contact with a surface of the specimen which is parallel to at least a component of the time-varying magnetic flux traversing the specimen, a magnetic core having a pair of spaced apart legs adapted to bear at their extremities against the same surface of the specimen as said probes, said probes and said magnetic core legs being positioned with respect to each other such that a line joining any two points respectively on the longitudinal axes of said legs is substantially perpendicular to a line joining any two points respectively on the longitudinal axes of said probes, a winding on said core, and circuit means connected to said winding and said probes for translating electrical signals derived from said winding and said probes into an indication of a magnetic property of the specimen.

14. In a device for measuring the magnetic properties of a specimen of magnetic material which is traversed by a time-varying magnetic flux, a pair of spaced apart conductive probes adapted to be positioned in essentially point contact with a surface of the specimen which is parallel to at least a component of the time-varying magnetic flux traversing the specimen, a laminated magnetic core having a pair of spaced apart legs adapted to bear at their extremities against the same surface of the specimen as said probes, said probes and said magnetic core legs being positioned with respect to each other such that the longitudinal axes of said probes and said legs respectively intersect the four sides of an imaginary rectangle, the points of intersection of said probe axes being on opposite sides of said imaginary rectangle and the points of intersection of said leg axes being on the remaining opposite sides of said imaginary rectangle, a winding on said core, and circuit means connected to said winding and said probes for translating electrical signals from said winding and said probes into an indication of a magnetic property of the specimen.

15. In a device for measuring the magnetic properties of a specimen of magnetic material which is traversed by a time-varying magnetic flux, a pair of spaced apart conductive probes having pointed extremities adapted to be positioned in essentially point contact with a surface of the specimen which is parallel to at least a component of the time-varying magnetic flux traversing the specimen, a laminated magnetic core including a pair of spaced apart legs having extremities which lie in a plane essentially parallel and nearly coplanar with a plane including said pointed extremities of said probes whereby both said probes and said legs may be placed in contact with the same surface of the specimen, said probes and said legs being positioned with respect to each other such that a line joining any two points respectively on the longitudinal axes of said legs intersects a line joining any two points respectively on the longitudinal axes of said probes, a winding on said core, and circuit means connected to said winding and said probes for translating electrical signals derived from said winding and said probes into an indication of a magnetic property of the specimen.

16. In a device for measuring the magnetic properties of a specimen of magnetic material comprising a support structure of nonmagnetic material, a pair of spaced apart conductive members supported by said structure in fixed interrelation and having portions extending beyond said structure which terminate in sharp points lying in an imaginary plane spaced a desired distance from said structure, a magnetic core supported by said structure in fixed relation to said conductive members and having a pair of spaced apart legs which extend beyond said structure in the same direction as said conductive members and terminate in an imaginary plane essentially parallel to said imaginary plane wherein said sharp points lie, the interrelationship of said conductive members and said core legs being such that the longitudinal axes of said conductive members and said core legs respectively intersect the four sides of an imaginary rectangle, the points of intersection of said conductive member axes being on opposite sides of said imaginary rectangle, a winding on said core, and means for making conductive connections to said conductive members and said winding.

17. In a device for measuring the magnetic properties of a specimen of magnetic material comprising a support structure of nonmagnetic material, a pair of conductive members maintained in spaced apart relationship by said support structure and having portions extending beyond said structure which terminate in sharp points lying in an imaginary plane spaced a desired distance from said structure, a magnetic core supported by said structure in fixed position and having a pair of spaced apart legs which extend beyond said structure in the same direction as said conductive members and terminate in an imaginary plane essentially parallel to said imaginary plane wherein said sharp points lie, said second-named imaginary plane being nearer said structure than said first-named imaginary plane, the interrelationship of said conductive members and said core legs being such that the longitudinal axes of said conductive members and said core legs respectively intersect the four sides of an imaginary rectangle, the points of intersection of said conductive member axes being on opposite sides of said imaginary rectangle, said core legs being extended inwardly toward each other to form a yoke portion of said magnetic core remote from said terminations of said legs, a winding on said yoke portion of said core, and means for making conductive connections to said winding and said conductive members.

18. In a device as in claim 16 wherein said yoke of said magnetic core is discontinuous to provide an air gap in said core.

19. In a device as in claim 16 wherein said yoke of said magnetic core is discontinuous to provide an air gap in said core and said winding is disposed on said yoke bridging the air gap.

20. A device for measuring the power loss in a specimen of magnetic material which is traversed by a time-varying magnetic flux comprising a pair of spaced apart conductive probes adapted to be positioned in essentially point contact with a surface of the specimen which is parallel to at least a component of said time-varying magnetic flux; a magnetic potentiometer adapted to be positioned in contact with the surface of the specimen with said probes including a laminated magnetic core having spaced apart legs the longitudinal axes of which lie in a plane intersecting a plane in which the longitudinal axes of said probes lie and also having a yoke which is discontinuous to form an air gap in said magnetic core, and a winding disposed on said yoke bridging said air gap; circuit means interconnecting said probes to one pair of terminals of a power responsive device; and circuit means interconnecting said winding with the other pair of terminals of said power responsive device, one of said circuit means including an integrating network.

21. A device for measuring the power loss in a specimen of magnetic material which is traversed by a time-varying magnetic flux comprising a pair of spaced apart conductive probes adapted to be positioned in essentially point contact with a surface of the specimen which is parallel to at least a component of said time-varying magnetic flux; a magnetic potentiometer adapted to be positioned in contact with the surface of the specimen adjacent said probes including a laminated magnetic core having spaced apart legs the longitudinal axes of which lie in a plane intersecting a plane in which the longitudinal axes of said probes lie and also having a yoke which is discontinuous to form an air gap in said magnetic core, and a winding disposed on said yoke bridging said air gap; a power responsive meter; circuit means including at least one amplification stage interconnecting said probes and said meter; and circuit means interconnecting said winding and said meter including the same number of amplification stages as said first recited circuit means, one of said circuit means including an integrating network.

22. A device for measuring the power loss in a specimen of magnetic material which is traversed by a time-varying magnetic flux comprising a pair of spaced apart conductive probes adapted to be positioned in essentially point contact with a surface of the specimen which is parallel to at least a component of said time-varying magnetic flux; a magnetic potentiometer adapted to be positioned in contact with the surface of the specimen adjacent said probes including a laminated magnetic core having spaced apart legs the longitudinal axes of which lie in a plane essentially perpendicularly intersecting a plane in which the longitudinal axes of said probes lie and also having a yoke which is discontinuous to form an air gap in said magnetic core, and a winding disposed on said yoke bridging said air gap; a power responsive meter; circuit means including two cascade-connected amplification stages interconnecting said probes and said meter; and circuit means interconnecting said winding and said meter including one amplification stage connected in cascade to a second amplification stage through an integrating network, the output of said second amplification stage being connected to said meter.

23. In a device for measuring the power loss in a specimen of magnetic material which is traversed by a time-varying magnetic flux, the combination which comprises means for obtaining a voltage proportional to the time rate of change of flux density within the specimen including a pair of spaced apart conductive probes adapted to be positioned in conductive relation with a surface of the specimen which is parallel to at least a component of the time-varying flux traversing the specimen, means for obtaining a voltage proportional to the time rate of change of magnetic field intensity in the specimen including a magnetic core having a pair of legs adapted to be disposed against a surface of the specimen at an angle including 90° with respect to a plane in which the axes of said probes lie and a winding on said core wherein said voltage proportional to the time rate of change of magnetic intensity is induced, means for integrating one of said obtained voltages with respect to time, and means for obtaining the product of said integrated voltage and the other of said voltages.

24. In a device for measuring the power loss in a specimen of magnetic material which is traversed by a time-varying magnetic flux, the combination which comprises a pair of spaced apart conductive probes adapted to be positioned in conductive relation with a surface of the specimen which is parallel to at least a component of the time-varying magnetic flux traversing the specimen whereby the voltage developed by the time-varying flux across said probes is proportional to the time rate of change of flux density in the specimen, a magnetic potentiometer including a magnetic core having a pair of legs disposed at an angle with respect to a plane in which the axes of said probes lie and a winding on said core, the extremities of said legs being adapted to be magnetically coupled to the specimen whereby the voltage induced in said winding by the time-varying flux is proportional to the time rate of change of magnetic intensity within the specimen, and circuit means connected to said probes and said windings for measuring the power loss in said specimen.

25. A device for comparing the power losses in specimens of magnetic material comprising a U-shaped laminated magnetic core the ends of which are adapted to be positioned in magnetic coupling relation with a surface of a specimen, a winding on said core, means for energizing said winding with a time-varying current to excite said core and the specimen with a time-varying magnetic flux, and a pair of spaced apart conductive probes adapted to be positioned in conductive relation with the surface of the specimen, a plane including the axes of said probes being at an angle with respect to a plane including the axis of said core, a wattmeter having a current coil connected in series with said winding and a voltage coil connected across said probes, and a voltmeter connected across said probes in parallel with said voltage coil of said wattmeter.

26. A device for displaying the hysteresis loop of a specimen of magnetic material which is traversed by a time-varying magnetic flux, the combination which comprises means for obtaining a voltage proportional to the time rate of change of flux density in the specimen including a pair of spaced apart conductive probes adapted to be positioned in conductive relation with a surface of the specimen which is parallel to at least a component of the time-varying flux traversing the specimen, means for obtaining a voltage proportional to the time rate of change of magnetic field intensity in the specimen including a magentic core having a pair of legs adapted to be disposed against a surface of the specimen at an angle with respect to a plane in which the axes of said probes lie and a winding on said core wherein said voltage proportional to the time rate of change of magnetic field intensity is induced, first circuit means connected to said probes and including an integrating network which transforms said voltage proportional to the time rate of change of flux density into a voltage proportional to flux density, second circuit means connected to said winding and including an integrating network which transforms said voltage proportional to the time rate of change of magnetic field intensity into a voltage proportional to magnetic field intensity, and an oscilloscope having a pair of vertical and a pair of horizontal deflection plates, one of said pairs of plates being connected to the output of said first circuit means and the other of said pairs of plates being connected to the output of said second circuit means.

27. A device as in claim 26 in which said pair of legs are disposed at essentially right angles with respect to a plane in which the axes of said probes lie.

28. A device as in claim 26 in which each of said circuit means includes at least one amplification stage.

29. A device as in claim 28 in which the same number of amplification stages are included in each of said circuit means.

30. A device for measuring the permeability of a specimen of magnetic material which is traversed by a time-varying magnetic flux, the combination which comprises means for obtaining a voltage proportional to the time rate of change of flux density in the specimen including a pair of spaced apart conductive probes adapted to be positioned in conductive relation with a surface of the specimen which is parallel to at least a component of the time-varying flux traversing the specimen, means for obtaining a voltage proportional to the time rate of change of magnetic fiield intensity in the specimen including a magnetic core having a pair of legs adapted to be disposed against a surface of the specimen at an angle with respect to a plane in which the axes of said probes lie and a winding on said core wherein said voltage proportional to the time rate of change of magnetic fiield intensity is induced, first circuit means connected to said probes including an integrating network which transforms said voltage proportional to the time rate of change of flux density into a time-varying voltage proportional to flux density and a rectifier which transforms the latter time-varying voltage into a direct voltage proportional to flux density, second circuit means connected to said winding including an integrating network which transforms said voltage proportional to the time rate of change of magnetic field intensity into a time-varying voltage proportional to magnetic field intensity and a rectifier which transforms the latter time-varying voltage into a direct voltage proportional to magnetic field intensity, and voltage responsive apparatus connected to the outputs of said circuits for determining the ratio of the respective direct voltages whereby the magnetic permeability of the specimen is determined.

31. A device as in claim 30 in which said pair of legs are disposed at essentially right angles with respect to a plane in which the axes of said probes lie.

32. A device as in claim 30 in which each of said circuit means includes at least one amplification stage.

References Cited in the file of this patent

UNITED STATES PATENTS

| | | |
|---|---|---|
| 1,440,470 | Kinnard | Jan. 2, 1923 |
| 1,985,277 | Braddon | Dec. 25, 1934 |
| 2,036,856 | Drake | Apr. 7, 1936 |
| 2,124,578 | Knerr | July 26, 1938 |
| 2,133,725 | Sperry et al. | Oct. 18, 1938 |
| 2,186,826 | Edgar | Jan. 9, 1940 |
| 2,213,983 | Gooding | Sept. 10, 1940 |
| 2,351,201 | Gillis | June 13, 1944 |

OTHER REFERENCES

Seisakusho, Japan, Abstract No. 4590, published Nov. 25, 1949.